United States Patent
Tyson et al.

(10) Patent No.: US 8,933,820 B1
(45) Date of Patent: Jan. 13, 2015

(54) SYSTEM AND METHOD FOR INDICATING A LANDING ZONE TO AN INBOUND HELICOPTER

(75) Inventors: Stephen E. Tyson, Marion, IA (US); Thomas L. Vogl, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 188 days.

(21) Appl. No.: 13/564,546

(22) Filed: Aug. 1, 2012

(51) Int. Cl.
*G08B 21/00* (2006.01)

(52) U.S. Cl.
USPC .......................... 340/946; 340/974; 340/950

(58) Field of Classification Search
USPC ......... 340/946, 973, 970, 974, 961, 963, 980, 340/977, 947, 949, 956, 958, 950, 952–954, 340/945
See application file for complete search history.

(56) References Cited

U.S. PATENT DOCUMENTS

| | | | |
|---|---|---|---|
| 5,986,581 A * | 11/1999 | Magdaleno et al. | 340/953 |
| 7,642,929 B1 * | 1/2010 | Pinkus et al. | 340/973 |
| 8,248,298 B2 * | 8/2012 | Lalezari | 342/179 |
| 8,366,037 B2 * | 2/2013 | Morris et al. | 244/1 TD |
| 2009/0005921 A1 * | 1/2009 | Wilkens et al. | 701/18 |
| 2009/0055038 A1 * | 2/2009 | Garrec et al. | 701/17 |
| 2010/0231418 A1 * | 9/2010 | Whitlow et al. | 340/945 |
| 2011/0173869 A1 * | 7/2011 | Uhm | 42/111 |
| 2011/0264312 A1 * | 10/2011 | Spinelli et al. | 701/16 |

* cited by examiner

*Primary Examiner* — Daniel Previl
(74) *Attorney, Agent, or Firm* — Angel N. Gerdzhikov; Donna P. Suchy; Daniel M. Barbieri

(57) ABSTRACT

A method of designating and communicating a desired LZ to an aircraft includes outputting a coded laser signal at or near a desired landing zone to indicate a location of the desired landing zone. The coded laser signal is received by an aircraft that desires to land at the desired landing zone. The location of the desired landing zone and an ingress path from a current location of the aircraft to the desired landing zone are determined by a processor provided with the aircraft.

20 Claims, 6 Drawing Sheets

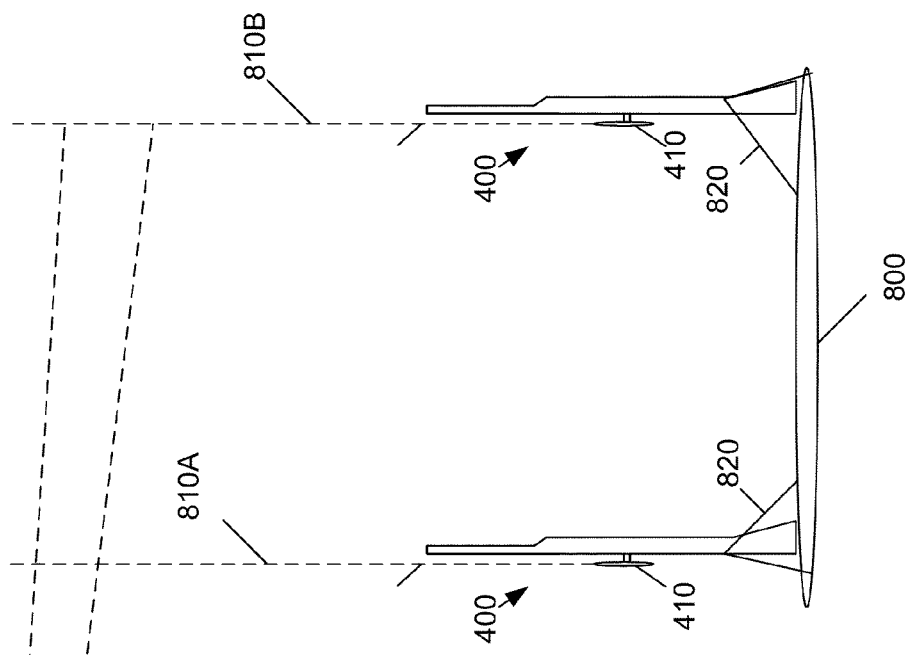
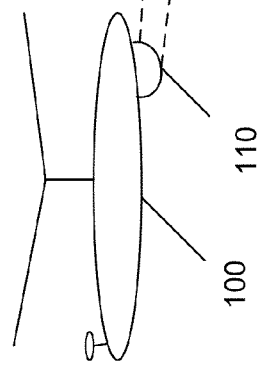
Fig. 8

SYSTEM AND METHOD FOR INDICATING A LANDING ZONE TO AN INBOUND HELICOPTER

FIELD OF THE INVENTION

The present specification relates to a system and method for indicating a landing zone for an inbound aircraft including but not limited to an inbound military helicopter that needs to pick up or drop off military personnel or supplies in a combat zone.

BACKGROUND

Military personnel, such as marines and army soldiers, and emergency personnel face significant challenges during aircraft pick up and drop off operations. These challenges can be particularly difficult when aircraft are used in a war zone. For instance, when military personnel are on a mission and need to be picked up by a helicopter in a fairly quick manner, the personnel have to indicate a desired possible Landing Zone (LZ) for an inbound helicopter that is to be sent to resupply them or pick them up and take them back to a safe location (e.g., a local military base).

Challenges for military personnel include accurately knowing the location of the desired LZ and communicating that location to the helicopter without having to use a specialized device (that is, by using only the normal equipment that a military personnel takes on a mission).

Given that military personnel in a war zone typically are burdened with having to carry a lot of equipment on a mission, it is desirable to not have them carry additional equipment for use in designating a desired landing zone for an aircraft that is to be sent to pick them up and take them back to a safe location. Along these same lines, it is desirable that military aircraft in a war zone, such as helicopters, not have to carry additional components for finding a desired landing zone and determining an appropriate path to the desired landing zone.

SUMMARY OF THE INVENTION

An exemplary embodiment relates to a landing zone designation system, which includes a laser transmitter provided at or near a desired landing zone for an aircraft and that outputs a coded laser signal to indicate a location of the desired landing zone. The system also includes a laser receiver provided on the aircraft for picking up the coded laser signal and for determining a location of where the coded laser signal is being transmitted. The system further includes a processor that receives information of the coded laser signal received by the laser receiver and that determines an ingress path from a current location of the aircraft to the location where the coded laser signal is being transmitted.

Another exemplary embodiment relates to a method of designating a landing zone for an aircraft. The method includes outputting, at a desired landing zone, a coded laser signal to indicate a location of the desired landing zone. The method also includes receiving, by the aircraft, the coded laser signal. The method further includes determining, by a processor on the aircraft, the location of the desired landing zone and an ingress path from a current location of the aircraft to the desired landing zone.

Another exemplary embodiment relates to a computer readable medium storing computer program product that, when executed by a computer, causes the computer to perform a functions of:

receiving, by an aircraft, data associated with a coded laser signal that is indicative of a desired landing zone for the aircraft;

determining, by a processor on the aircraft, the location of the desired landing zone; and determining, by the processor on the aircraft, an ingress path from a current location of the aircraft to the desired landing zone.

BRIEF DESCRIPTION OF THE DRAWINGS

Exemplary embodiments are hereafter described with reference to the accompanying drawings, wherein like numerals denote like elements; and:

FIG. 8 is a schematic drawing that shows a designated LZ that has been marked using rifles having a laser that can mark the desired LZ, causing coherent laser light to be reflected upward, to be detected by a helicopter that is can then determine the location of the designated LZ based on that detection, according to an exemplary embodiment.

DETAILED DESCRIPTION OF THE PREFERRED EMBODIMENTS

Figure 1:
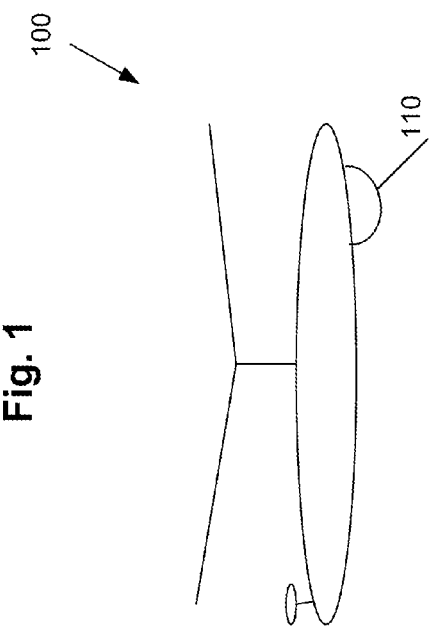
FIG. 1 shows a schematic drawing of a helicopter with an Electro-Optical/Infrared (EO/IR) turret that can be directed to a designated landing zone (LZ) by way of coded laser signals, according to an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

At least one embodiment relates to a system and/or method for designating a desired landing zone (LZ) for an aircraft by user of a laser transmission output from the desired LZ, for receiving the laser transmission by the aircraft, and for determining an ingress path for the aircraft to the desired LZ.

According to one embodiment, existing components on an aircraft and on military personnel to be picked up by an aircraft are utilized to designate a desired LZ for the military personnel to be picked up by the aircraft. For example, a laser transmission unit, such as a laser transmission unit provided on a standard issue U.S. military rifle, can be used to designate a desired LZ at a particular location. An aircraft, for example, a military helicopter, can then be informed as to a particular code or frequency output by the laser transmission unit, such as by way of a secure voice communication channel. With that information, an Electro-optic/Infrared sensor, such as one provided on an EO/IR turret on a helicopter, can be tuned to receive at least one laser signal on the particular frequency output by the laser transmission unit. Upon receiving the at least one laser signal output at the desired LZ, a processor on the helicopter can determine an ingress path to the desired LZ, and additionally it can determine a suitable egress path from the desired LZ to a safe location (such as a local military base).

FIG. 1 shows a helicopter 100 that includes an EO/IR turret 110 that can be used to pick up coded laser transmissions output by military personnel to indicate a desired LZ for use to picking up the military personnel and taking them to a safe location. The EO/IR turret 110 is shown on the bottom portion of the helicopter 100, and can pick up EO and IR signals over a 360 degree field of coverage. The EO/IR turret 110 is typically used to pick up EO and/or IR signals that are used by military personnel to illuminate a potential target to be attacked by the helicopter 100, and in at least one embodiment the EO/IR turret 110 is provided with an additional use of receiving a laser transmission that indicates a desired LZ for at least one military person to be picked up by the helicopter 100.

Figure 2:
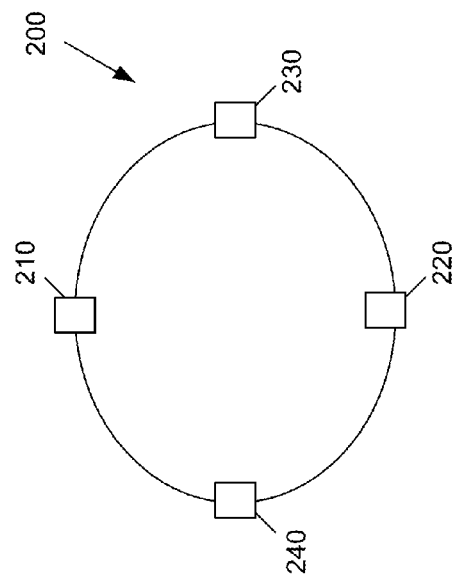
FIG. 2 is a top down view schematic drawing of a designated landing zone (LZ) that has been marked using laser transmission devices, according to an exemplary embodiment.

FIG. 2 shows a top down view of a desired LZ 200, in which the desired LZ 200 is designated by way of a first laser transmitter 210 that sets the northmost position of the desired LZ 200, a second laser transmitter 220 that sets the southmost position of the desired LZ 200, a third laser transmitter 230 that sets the eastmost position of the desired LZ 200, a fourth laser transmitter 240 that sets the westmost position of the desired LZ 200.

Once the edge positions of the desired LZ 200 have been set by military personnel, such as in the manner as shown in FIG. 2, the military personnel can move out of the desired LZ 200. The military personnel may stay relatively close by to the desired LZ 200 so that when the helicopter lands at the desired LZ 200, they can quickly get on board and leave that location to get to a safer location.

The laser transmitters 210-240 may output a visible beam in some implementations, or an invisible beam (that is, invisible to a human eye) in other implementations. The visible beam can provide a visual cue for a helicopter to use when approaching the desired LZ 200, together with the laser signal being tracked by the helicopter 100 to get to the desired LZ 200. The laser beams output by the laser transmitters 210-240 output laser light is in an upwards (skyward) direction, and so the military personnel setting the laser transmitters 210-240 on the ground should carefully position and secure those transmitters to ensure that occurs. If the laser beams do not output laser light directly upwards, then the helicopter may not be able to determine the exact location of the desired LZ based on detection of the coded laser transmissions, but it can hone in on the desired LZ as it gets closer to that location.

Military personnel, such as marines or army soldiers, are typically informed as to the necessary size of a desired LZ and the flatness of the ground for a desired LZ in their military education, and so based on that knowledge, they can find a suitable place for a helicopter to land and pick them up from a war zone. Once the suitable place is found, the first through fourth laser transmitters 210-240 are placed on the ground, and turned on to thereby output coded laser signals. In some embodiments, the coded laser signals can be output as omnidirectional signals, so that a helicopter coming in any particular direction can pick up those laser signals.

In FIG. 2, four separate rifles with laser designators can be used for the first through fourth laser transmitters 210-240, such as rifles carried by four marines in the field. If there are less than four military personnel, then the desired LZ can be designated by one (placed in the center of the desired LZ), two (one put in a northmost position and one put in a southmost position or one put in an eastmost position and one put in a westmost position, for example) or three laser transmitters (placed on edges of the desired LZ to form a triangular shape, for example).

Figure 3:
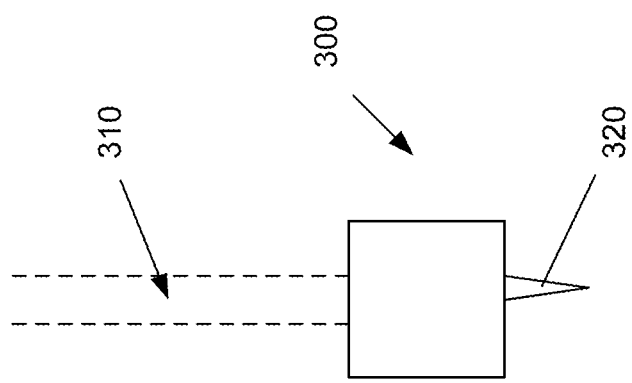
FIG. 3 is a side view schematic drawing of a laser transmission device that can be used to mark a designated LZ, according to an exemplary embodiment.

In other embodiments, each military person may carry additional laser output devices separate from the laser output device on their respective rifle. In FIG. 3, a hand-held laser transmission unit 300 is shown, which outputs a coded laser signal (shown in FIG. 3 as laser beam 310) based on a setting made on the hand-held laser transmission unit 300 by a soldier carrying the unit 300. The unit 300 may be small in size and light in weight, such as less than five (5) pounds and less than 5 inches by 5 inches by 5 inches in length-width-depth.

In other embodiments, laser transmissions to designate a desired LZ may be output by a portable system such as an AN/PED-1 Lightweight Laser Designator Rangefinder (LLDR), which has a usable range of approximately 5 kilometers.

The unit 300 also may be provided with a mechanism for rigidly setting the unit 300 onto the ground so that the unit 300 will not easily move from that position, and for ensuring the that the unit 300 outputs laser light in an upward (skyward) direction. A spike 320 or other suitable mechanism may be provided on the hand-held transmission unit 300 for rigidly setting it onto the ground at a particular location. The spike 320 can be disposed such that in a normal, non-operational usage of the unit 300, the spike 320 can be folded against the unit 300 and does not extend outwards, and in an operational usage of the unit 300 the spike can be pivoted such that it extends outwards from the unit 300 (in FIG. 3, it extends downwards). With the spike 320 extended, it can be fairly easily pushed into the ground at a particular location, to thereby hold the unit 300 in place at that particular location, even under adverse weather conditions. The unit 300 may be battery powered, for example, so that the unit 300 can output laser signals when needed.

In some embodiments, the military personnel communicate via a voice channel with the helicopter 100 that is being sent to pick them up and to locate the desired LZ made by the military personnel. A standard secure voice communications device may be used to provide for such voice communications, whereby this provides a level of authentication by way of the military personnel having to provide a code-of-the-day or other form of authentication to the helicopter that is coming to pick them up. A standard-issued radio carried by military personnel can be used to communicate with the helicopter 100 in some implementations, and/or a secure cellular phone can be used in other implementations.

In some embodiments, a user may use a code-of-the-day of a voice channel that is keyed off of date and/or location, and in other embodiments a shared rolling key/token method may be used in a voice channel to provide an additional level of authentication of the personnel who have output laser signals for providing a desired LZ.

In some embodiments, the user of a voice channel to authenticate the transmission of the laser signals designating a desired LZ also can provide a confirmation that the signal has been detected so the individuals on the ground seeking to be picked up no longer needs to designate the desired LZ. This can be useful to minimize the exposure of the individuals on the ground and of the signal to detection by unintended observers.

Figure 4:
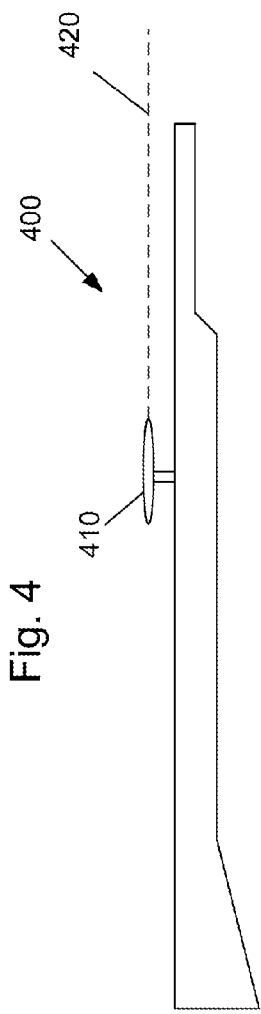
FIG. 4 is a side view schematic drawing of a rifle having a laser designator that can be used to mark a designated LZ, according to an exemplary embodiment.

FIG. 4 shows in simplified form a standard issue military rifle 400, which includes a laser designator 410 that can be used in one or more embodiments described above as a laser transmission device that can be used to designate a LZ for a helicopter or other military aircraft to pick up military personnel in the field. The laser designator 410 can be set so as to output a coded laser signal 420 at a preset laser frequency of the rifle 400 and at one of a plurality of codes, based on settings made on the rifle 400 by a person carrying the rifle 400. Though not shown in FIG. 4, the rifle may include a settings region by which a person can set a laser frequency and a laser code by way of switches set to particular positions (e.g., 0 or 1). With such settings made, information as to the laser frequency and laser code can be sent to the helicopter, such as by way of a secure voice communications channel. In other implementations, the laser designator 410 may output a coded laser signal at one of a plurality of laser frequencies that are capable of being output by the rifle 400, in which each of the laser frequencies can be set to output a coded laser signal at one of a plurality of different codes.

In some embodiments, multiple laser transmission frequencies and/or laser transmission patterns can be used to further isolate usage from unintended observers or differentiate particular users on the ground. These determinations can be made before-hand or by dynamic communications, such as by voice. The different frequencies or patterns can be used to differentiate the laser signals being received by the helicopter, such as for designating different corners (NE, NW, SW, SE) of the desired LZ, etc.

In some embodiments, the helicopter 100 utilizes other sensors provided on the helicopter 100 in order to determine the suitability of the desired LZ. For example, radar signals and/or light detection and ranging (LIDAR) signals can be used to determine the feasibility of the desired LZ, along with the coded laser signals already received. The EO/IR turret 110 of the helicopter 100 can be used to transmit and receive those other sensor signals in some implementations.

In some embodiments, the helicopter 100 may only be able to detect less than all of the laser signals that set out the desired LZ. In those instances, by detecting at least one of the laser signals e.g., the laser signal designating the SW corner of the desired LZ, as the helicopter 100 gets closer to the desired LZ on its ingress path, it should be able to detect the other coded laser signals designating the other corners of the desired LZ, in order to get more information that it can use to determine whether the desired LZ is acceptable to land and to further refine its ingress path to the desired LZ.

Based on the computations performed by a processor within the helicopter 100, such as a mission computer, the military personnel on the ground can be informed as to whether or not a landing is to be made, and such informing can be done via a secure telecommunications channel or other suitable communications channel (e.g., a voice channel on a standard military-issue radio). If a landing is to be made at the desired LZ, the helicopter 100 can use its IR sensor (within the EO/IR turret 110) to clear the landing zone of any persons who might be on the ingress path of the helicopter 100 to the landing zone. IR sensors are especially useful for missions performed at night, so as to provide more information than is typically available using EO and visible spectrum sensors. By the use of one or more of these different types of sensors, individuals on the ground seeking to be picked up by the helicopter 100 can be informed in time to move to a place of safety away from the ingress path of the helicopter 100 to the desired landing zone. If the desired landing zone is determined to be unfeasible, that determination is communicated by the helicopter 100 to the military personnel on the ground, who then have to find another desired landing zone and mark it with one or more suitable laser transmitters.

Figure 5:
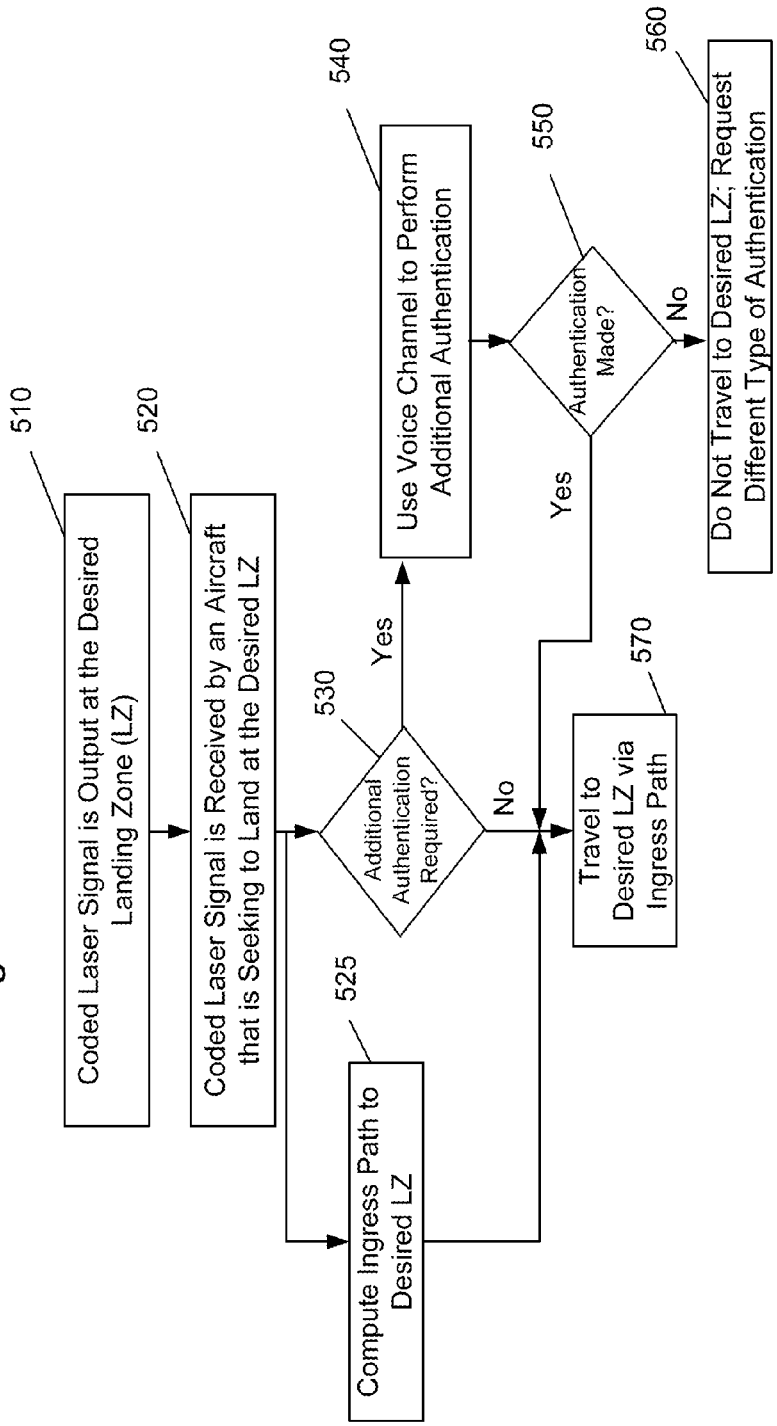
FIG. 5 is a flow chart showing steps in a method for output information of a designated LZ and determining the location of the designated LZ by an aircraft, according to an exemplary embodiment.

FIG. 5 is a flow diagram illustrating a method of designating and communicating a desired LZ to an aircraft, according to an embodiment. In a stage 510, a coded laser signal is output at the desired landing zone to indicate a location of the desired landing zone. In a stage 520, the coded laser signal is received by an aircraft that desires to land at the desired landing zone. In a stage 530, it is determined whether additional authentication is required. Prior to or currently with the performing of stage 530, in stage 525, an ingress path to the desired LZ is computed. If additional authentication is required (the "Yes" path output from stage 530), then in a stage 540, a voice channel is used to perform additional authentication with personnel at the desired LZ seeking to be picked up. In a stage 550, it is determined if the voice channel authentication is successful. If the authentication is not successful (the "No" path output from stage 550), then in a stage 560, the aircraft does not travel to the desired LZ, and the process may further request a different type of authentication that does not utilize a voice channel, such as: a) providing colored smoke at or near the desired LZ, b) providing a sequence of gestures by persons at or near the desired LZ, c) and/or placing a pattern of reflective panels on the ground at or near the desired LZ. If the authentication is successful (the "Yes" path output from stage 550), then in a stage 570, the aircraft travels to the desired LZ via the computed ingress path. The stage 570 is also performed when additional authentication is not required (the "No" path output from stage 530). In other implementations, the computation of the ingress path to the desired LZ may be performed prior to or currently with stage 510 or stage 520.

In some embodiments, additional light emitters can be used along with the laser output units to designate the LZ. This may be useful at night or in bad weather conditions, to provide additional illumination of the designated LZ as a visual cue, such as when the helicopter is close to the designated LZ and needs additional help in finding it. The additional light emitters may correspond to spot beams that can be set to output light of a particular color, such as red or green. In some implementations, each spot beam includes a switch provided on the outer housing of the spot beam, to allow a user to set the light to be output by the spot beam to one of a plurality of different colors. In some implementations, the spot beams may output strobe lights to provide a better visual indication of where the desired LZ is located when the helicopter 100 hovers close to the designated area.

In some embodiments, no additional equipment is needed by the helicopter and the military personnel on the ground in order to designate a desired LZ, other than existing devices (e.g., EO/IR turret on the helicopter, rifle with laser designator carried by the military personnel on the ground), so that little if any incremental cost to existing systems would be required to implement the capability to designate and find a desired helicopter landing zone.

Figure 6:
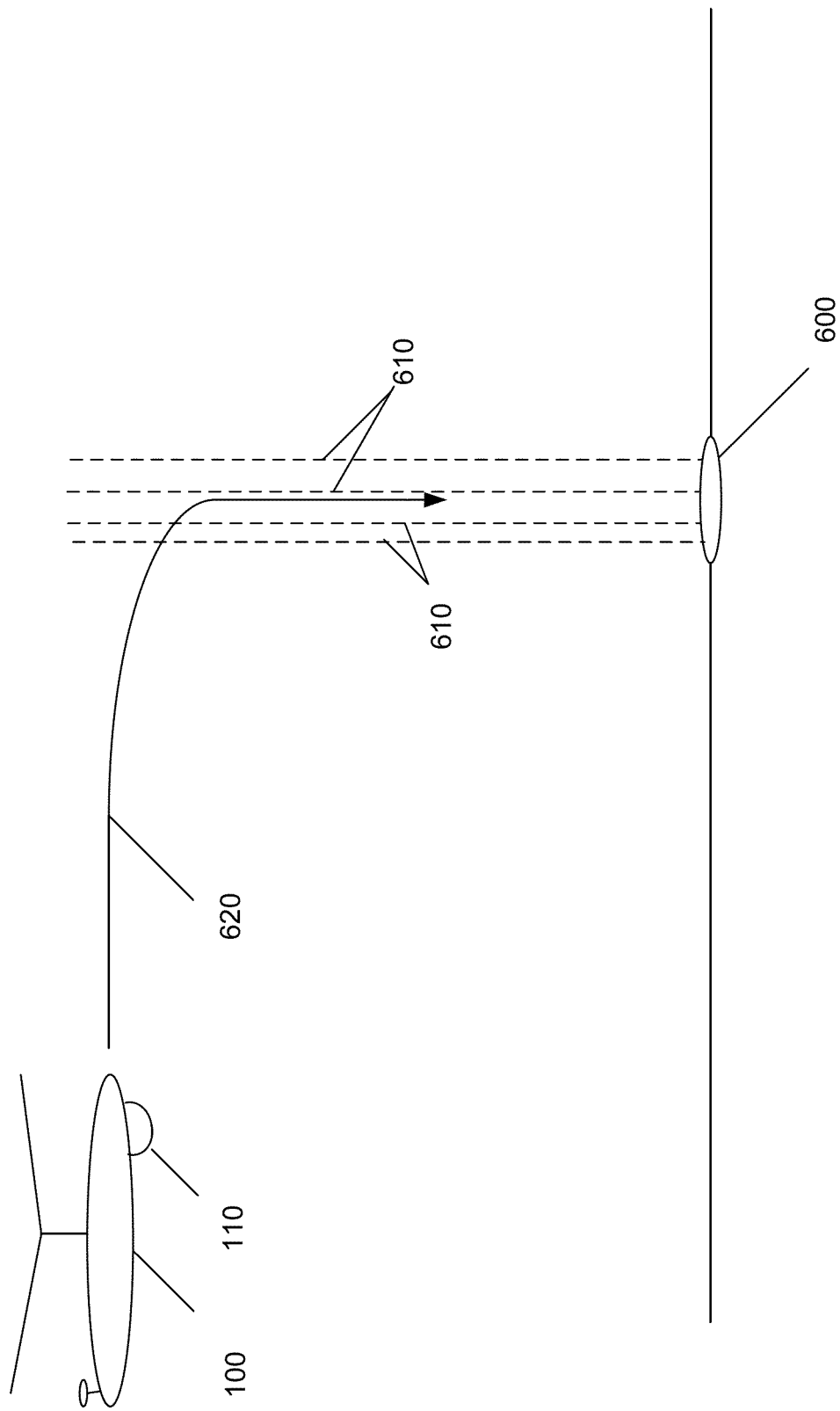
FIG. 6 is a schematic drawing that shows an ingress path of a helicopter to a designated LZ that has been marked using laser transmission devices that output laser signals directly upwards, according to an exemplary embodiment.

FIG. 6 shows laser signals 610 output by a plurality of laser units that output light directly upwards, so as to designate a desired LZ 600 to an approaching helicopter 100. The helicopter 100 uses its EO/IR turret 110 to detect the laser signals 610, and the helicopter 100 flies along an ingress path 620 to the desired LZ 600.

Figure 7:
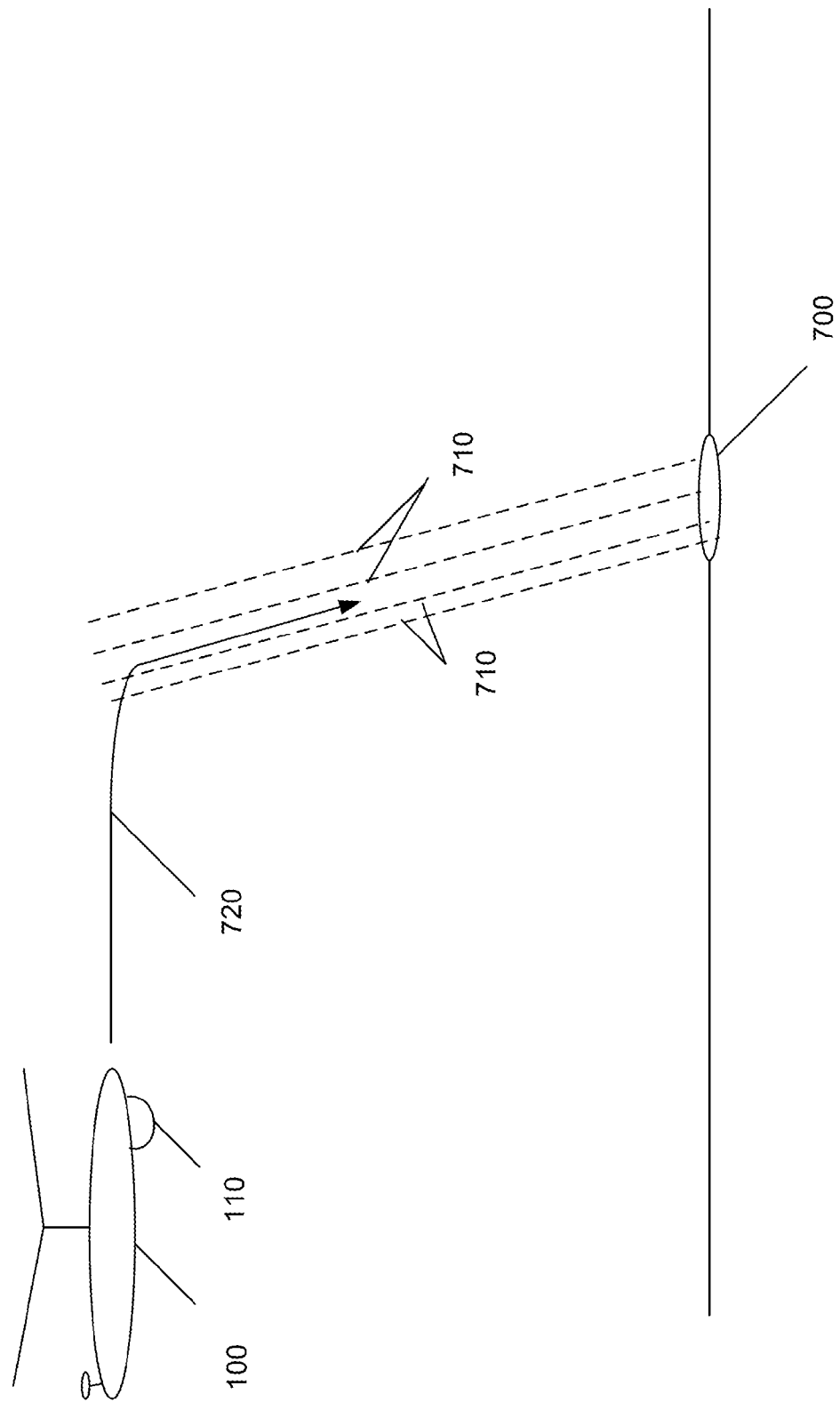
FIG. 7 is a schematic drawing that shows an ingress path of a helicopter to a designated LZ that has been marked using laser transmission devices that output laser signals in a diagonally upwards direction, according to an exemplary embodiment.

FIG. 7 shows laser signals 710 output by a plurality of laser units that output light in a diagonal directions (i.e., not directly upwards), so as to designate a desired LZ 700 to an approaching helicopter 100. The helicopter 100 uses its EO/IR turret 110 to detect the laser signals 710, and the helicopter flies along an ingress path 720 to the desired LZ 600. In FIG. 7, the helicopter 100 basically follows the path of the laser signals 710 towards the desired LZ 700. Thus, as seen from FIG. 6 and FIG. 7, it is not necessary that the laser signals be output directly upwards, but rather the laser signals need only be output in an upwards direction so as to be detectable by a helicopter.

The ingress path of the helicopter 100 may be computed by a computer provided within the helicopter 100, which executes software stored on a tangible storage device, such as a digital video disk (DVD), or on a computer hard drive, and which determines an appropriate flight direction (and optionally, an appropriate flight altitude) to the desired LZ. In some embodiments, based on information provided by military personnel at or near the desired LZ, such as latitude and longitude coordinates of the desired LZ, the helicopter 100 may use its standard flight path determination components to plot a path to the desired LZ.

When the helicopter 100 gets close enough to the desired LZ so as to be able to detect the coded laser signals that highlight the desired LZ (e.g., within 5 km of the desired LZ), the helicopter 100 can then fly in a direction towards the coded laser signals and follow the coded laser signals all the way to the desired LZ, such as in a manner as shown in FIG. 6 or FIG. 7. The helicopter 100 can plot an egress path back to its home military base using flight path software executed by a computer provided within the helicopter 100, based on the latitude and longitude coordinates of the desired LZ and the latitude and longitude coordinates of its home military base.

FIG. 8 shows one way of marking a LZ with rifles 400, according to some embodiments. Each rifle 400 is positioned at a desired location, shown in that figure as a westmost position and an eastmost position of the desired LZ 800, and each rifle 400 is firmly positioned at those locations by way of a rifle tripod 820, or bipod, or use of a prone shooting position. The two rifles 400 respectively output coded laser signals 810A, 810B from laser designators 410 in an upwards direction, which can be picked up by an EO/IR turret 110 of a helicopter 100 that has been sent to find the desired LZ 800 and pick up personnel at that location.

It is understood that while the detailed drawings, specific examples, material types, thicknesses, dimensions, and particular values given provide a preferred exemplary embodiment 4813-2899-1504.1 of the present invention, the preferred exemplary embodiment is for the purpose of illustration only. The method and apparatus of the invention is not limited to the precise details and conditions disclosed. Various changes may be made to the details disclosed without departing from the spirit of the invention which is defined by the following claims.

What is claimed is:

1. A landing zone designation system, comprising:
   a laser transmitter provided at or near a desired landing zone for an aircraft and that outputs a coded laser signal to indicate a location of the desired landing zone;
   a laser receiver provided on the aircraft for picking up the coded laser signal and for determining a location of where the coded laser signal is being transmitted; and
   a processor that receives information of the coded laser signal received by the laser receiver and that determines an ingress path from a current location of the aircraft to the location where the coded laser signal is being transmitted.

2. The landing zone designation system according to claim 1, wherein the aircraft comprises a helicopter.

3. The landing zone designation system according to claim 2, wherein the laser receiver comprises an electro-optic/infrared turret provided on the helicopter.

4. The landing zone designation system according to claim 1, wherein the laser transmitter is provided on a rifle.

5. The landing zone designation system according to claim 4, wherein the laser transmitter provided on the rifle corresponds to a target sighting device.

6. The landing zone designation system according to claim 1, further comprising:
   a portable voice communications unit that is configured to provide secure voice communications with the aircraft by a person not located within or near the aircraft,
   wherein the secure voice communications is used to authenticate the desired landing zone.

7. A method of designating a landing zone for an aircraft, comprising:
   outputting, at a desired landing zone, a coded laser signal to indicate a location of the desired landing zone;
   receiving, by the aircraft, the coded laser signal; and
   determining, by a processor on the aircraft, the location of the desired landing zone and an ingress path from a current location of the aircraft to the desired landing zone.

8. The method according to claim 7, wherein the aircraft comprises a helicopter.

9. The method according to claim 8, wherein the receiving is accomplished by an electro-optic/infrared turret provided on the helicopter.

10. The method according to claim 7, wherein the coded laser signal is output by a laser transmitter that is provided on a rifle.

11. The method according to claim 10, wherein the laser transmitter corresponds to a target sighting device.

12. The method according to claim 7, further comprising:
    establishing secure voice communications with the aircraft by a person not located within or near the aircraft,
    wherein the secure voice communications is used to authenticate the desired landing zone.

13. A non-transitory computer readable medium storing computer program product that, when executed by at least one computer, performs the functions of:
    receiving, by the aircraft, data associated with a coded laser signal that indicates a location of a desired landing zone for the aircraft; and
    determining, by the aircraft, the location of the desired landing zone and an ingress path from a current location of the aircraft to the desired landing zone.

14. The non-transitory computer readable medium according to claim 13, wherein the aircraft comprises a helicopter.

15. The non-transitory computer readable medium according to claim 14, wherein the receiving is accomplished by an electro-optic/infrared turret provided on the helicopter.

16. The non-transitory computer readable medium according to claim 13, wherein the coded laser signal is output by a laser transmitter that is provided on a rifle.

17. The non-transitory computer readable medium according to claim 16, wherein the laser transmitter corresponds to a target sighting device.

18. The non-transitory computer readable medium according to claim 13, further comprising:
establishing secure voice communications with the aircraft by a person not located within or near the aircraft; and
authenticating the desired landing zone using the secure voice communications.

19. The non-transitory computer readable medium according to claim 18, wherein the authenticating using the secure voice communications is performed by confirming an appropriate code-of-the-day uttered by the person at the desired landing zone.

20. The non-transitory computer readable medium according to claim 13, wherein the coded laser signal is output by a lightweight laser designator rangefinder (LLDR).

\* \* \* \* \*